(12) United States Patent
Kesseg

(10) Patent No.: US 7,219,899 B2
(45) Date of Patent: May 22, 2007

(54) COLLAPSE-CONTROLLED, ROTATION-RESISTING BULB SEAL

(75) Inventor: Richard Kesseg, Salem, OH (US)

(73) Assignee: Mantaline Corporation, Mantua, OH (US)

( * ) Notice: Subject to any disclaimer, the term of this patent is extended or adjusted under 35 U.S.C. 154(b) by 8 days.

(21) Appl. No.: 11/287,536

(22) Filed: Nov. 23, 2005

(65) Prior Publication Data

US 2006/0108747 A1    May 25, 2006

Related U.S. Application Data

(60) Provisional application No. 60/630,493, filed on Nov. 23, 2004.

(51) Int. Cl.
*F16J 15/02* (2006.01)

(52) U.S. Cl. .................. 277/645; 277/921; 49/490.1

(58) Field of Classification Search ................ 277/630, 277/637, 644–648, 921; 49/91.1, 355, 466, 49/475.1, 490.1
See application file for complete search history.

(56) References Cited

U.S. PATENT DOCUMENTS

| 3,025,576 A | 3/1962 | Herman |
|---|---|---|
| 3,178,779 A | 4/1965 | Clark et al. |
| 4,308,302 A | 12/1981 | Etter et al. |
| 4,447,065 A | 5/1984 | Dupuy et al. |
| 4,448,430 A | 5/1984 | Bright |
| 4,702,039 A | 10/1987 | Bocchinfuso |
| 4,761,917 A | 8/1988 | Knect et al. |
| 4,813,184 A | 3/1989 | Weimar |
| 5,194,691 A | 3/1993 | Mellwraith |
| 5,489,104 A * | 2/1996 | Wolff .................. 277/646 |
| 6,116,615 A | 9/2000 | Trehan |
| 6,273,433 B1 | 8/2001 | Yu |
| 6,471,381 B2 | 10/2002 | Atkinson et al. |
| 6,623,832 B2 | 9/2003 | Greven |
| 6,846,034 B1 | 1/2005 | Angus et al. |
| 6,922,945 B2 | 8/2005 | Dron |

\* cited by examiner

*Primary Examiner*—Vishal Patel
(74) *Attorney, Agent, or Firm*—Hahn Loeser & Parks LLP.; Bret A. Hrivnak

(57) ABSTRACT

The present invention provides a bulb seal capable of navigating both interior corners and exterior corners of an opening while maintaining consistent and adequate sealing capacity, the invention comprising a tubular member having internal strain-controlling cavities, vent holes, and a pair of external collapse-controlling protrusions, and an attachment member for receiving a component to be sealed.

18 Claims, 2 Drawing Sheets

COLLAPSE-CONTROLLED, ROTATION-RESISTING BULB SEAL

This application claims priority from, and incorporates by reference, U.S. provisional patent application No. 60/630,493, filed on Nov. 23, 2004.

TECHNICAL FIELD

The present invention relates to a seal and, more specifically, to an improved bulb seal.

BACKGROUND OF THE INVENTION

Bulb seals are often used to seal compartments and the like, which often requires the seal to navigate a corner of the compartment. Prior art bulb seals tend to rotate and buckle when applied to less rounded corners, creating inconsistent compartment sealing. Rotation and buckling occurs because prior art seals are unable to properly handle the loads generated from bending the seal about a vertical axis. To make matters worse, seals may be required to navigate outside and inside corners along the same perimeter. This is a problem since outside corners provide loading conditions contrary to those provided by inside corners. Prior art seals have been unable to remedy buckling and rotation problems for both corner conditions along the same perimeter, instead remedying one and not the other.

Accordingly, there is a need for a bulb seal that provides improved sealing properties when navigating a less rounded corner for both outside and inside corners.

SUMMARY OF THE INVENTION

In one embodiment, the invention comprises a seal comprising: a tubular member having a length and a cross section that comprises: a top portion, a bottom portion, and opposing side portions; an interior surface and an exterior surface, wherein a sealing first contact surface comprises at least a portion of the top portion of the exterior surface; a pair of collapse-controlling protrusions located on the exterior surface, wherein each of the protrusions are located between the contact surface and one of the side portions such that the contact surface is located between the pair of protrusions; a first plurality of shape-maintaining cavities located along one side portion of the interior surface and a second portion of shape-maintaining cavities located along the opposing side portion of the interior surface, wherein the first and second pluralities are asymmetrically opposite each other about a vertical axis extending between the bottom and top portions and through a center of the tubular member; and a rotation-resisting extension; and means for attaching the seal to a desired object, wherein the means is operably attached to the tubular member along the member's length at the bottom portion of the member, wherein the rotation-resisting extension extends from the tubular member and operably connects to the means for attaching.

In another embodiment, the invention comprises a seal comprising: a tubular member having a length and a cross section that comprises: a top portion, a bottom portion, and opposing side portions; an interior surface and an exterior surface, wherein a sealing first contact surface comprises at least a portion of the top portion of the exterior surface; a pair of collapse-controlling protrusions located on the exterior surface, each of the protrusions being located between the contact surface and one of the side portions such that the contact surface is located between the pair of protrusions, wherein the pair of protrusions are asymmetrically opposite each other about a vertical axis extending between the bottom and top portions and through a center of the tubular member; a first plurality of strain-controlling cavities located along one side portion of the interior surface and a second portion of strain controlling cavities located along the opposing side portion of the interior surface; and a rotation-resisting extension; and an attachment member operably attached to the tubular member along the member's length, wherein the rotation-resisting extension extends from the tubular member and operably connects to the attachment member.

DETAILED DESCRIPTION OF THE INVENTION

Figure 1:
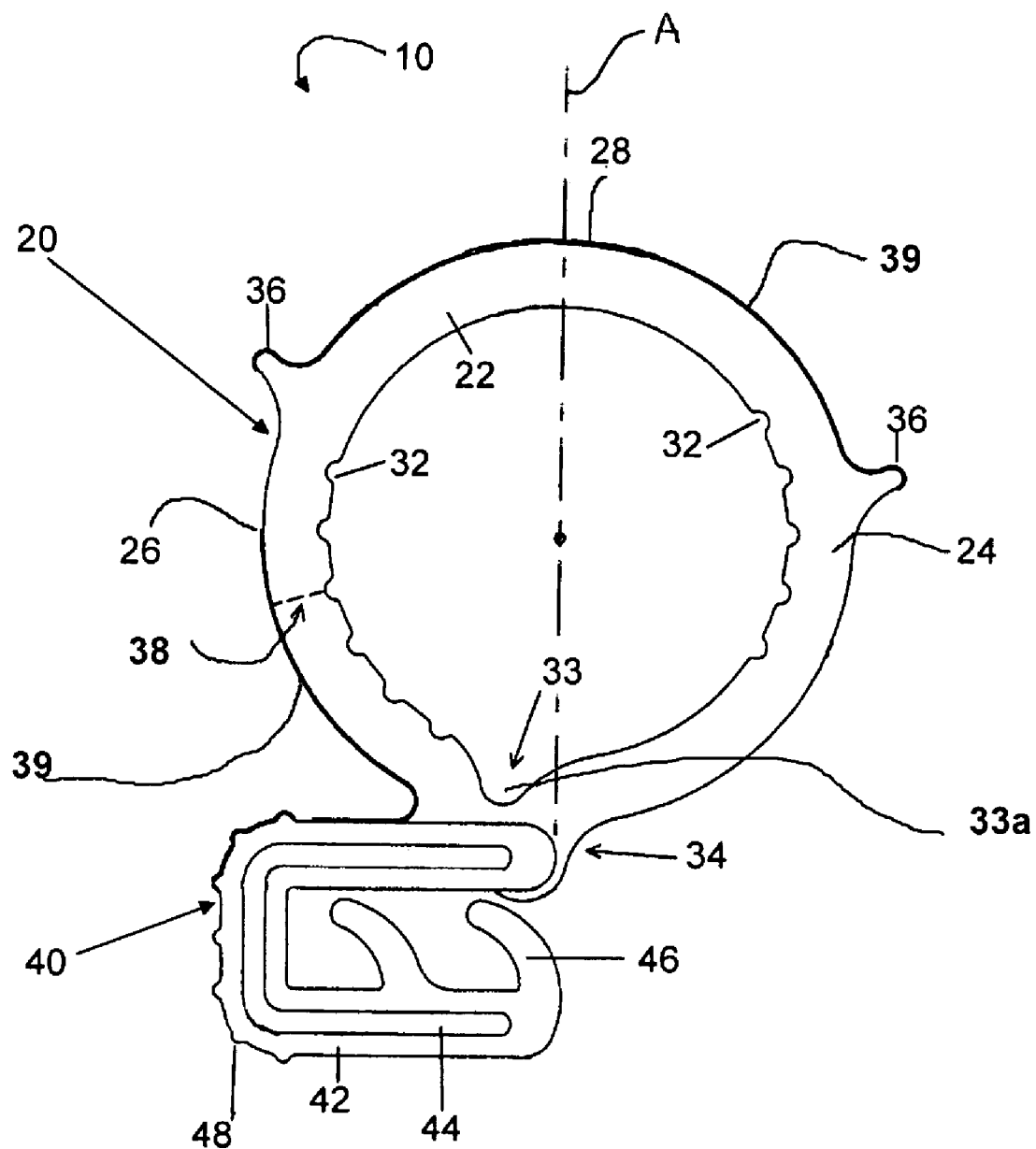
FIG. 1 is a cross-sectional view of one embodiment of a bulb seal.

Referring to FIG. 1, improved bulb seal 10 comprises a deflection controlling bulb 20 and an attachment means (or attachment member) 40. In one embodiment, seal 10 is made from any commercially available form of rubber, elastomer, or thermoplastic and produced by an extrusion process. An exception is that internal stiffening member 44 may be formed of any commercially available metal or plastic. Also, it is contemplated that seal 10 may be produced by any other commercially available means. Finally, seal 10 may include any commercially available coating 39 that provides heat and UV resistance for continued sealing performance, of which may comprise fluoropolymer polyurethane.

Bulb 20 has side portions 24, 26, top portion (or sealing contact surface) 28 for contacting a sealing surface 50, and bottom connection (or base portion) 33. Seal 10 may navigate both outside (or exterior) corners and inside (or interior) corners along any sealed perimeter. Positioning bulb 20 lower on attachment means 40, or closer to the open end of means 40, allows the bulb 20 to better track any corners along the opening to which the seal 10 is attached, thereby shifting the neutral axis to better distribute stresses or forces and better avoid or reduce bulb buckling. When navigating an outside corner, side portion 24 is facing the interior of the component on which seal 10 is mounted, while side portion 26 faces the exterior thereof. Under these conditions, side portion 24 experiences compressive forces, while side portion 26 experiences tensile forces. At some point between portions 24, 26 there is a neutral axis where the stress is zero. Because the loading conditions experienced when navigating an outside corner are converse to those of an inside corner, seal 10 must be able to handle both conflicting load conditions.

The core of bulb 20 comprises a body (or tubular member) 22. Body 22 is tubular, meaning it has a wall of predetermined thickness that forms a closed cross-sectional shape. In one embodiment, the shape is substantially circular, although it is contemplated that elliptical or rectangular shapes may be beneficial in certain situations. Further, a series of vent holes 38 may exist along a portion of body 22 to allow bulb 20 to collapse. In one embodiment, the vent holes 38 are approximately 4 millimeters (mm) in diameter and are spaced approximately every 457 mm along the length of the seal 10. It is contemplated that other hole sizes and/or spacings may be used as desired or as required by the intended use of seal 10. The wall thickness is determined by the requirements of the contemplated application. A thinner wall thickness is desirable when lower closing forces are contemplated, meaning lower forces are available or desired to close a sealed compartment. A thinner wall thickness may also be desirable to maintain the closing force when more rigid material is used to form seal 10. A thicker wall thickness would be desired in situations contrary to those specified above. Further, wall thickness also affects seal 10 durability, fatigue, and tear properties. Thus, it is beneficial to consider the material used when determining the wall thickness.

The interior of bulb 20 includes shape-maintaining (or strain-controlling or rotation resisting) cavities 32, which are placed along the interior of side portions 24, 26. The purpose of cavities 32 is to provide seal 10 a more consistent cross-sectional shape, with minimal deformation and rotation, when seal 10 navigates a corner along the perimeter of a sealed area. Cavities 32 achieve their purpose by removing material from portions 24, 26 in predetermined areas, allowing side portions 24, 26 to axially stretch or compress for the purpose of preventing any significant cross-sectional deformation or rotation, whether navigating an outside or inside corner.

In this invention, its been determined that an asymmetric arrangement of cavities 32 is beneficial to maintaining the shape and attitude of the tubular member 22 as the seal 10 navigates interior and exterior corners, in addition to controlling the collapse of tubular member 22. However, the seal 10 design may change based on the intended application. Consequently, the number of required cavities 32 and their locations depends upon the location of bulb 20 in relation to attachment means 40 (or the location of connection 33), the properties of the seal material, and the closing loads required by the intended application thereof. This means that, although an asymmetric arrangement of cavities 32 exists, the number of cavities and their locations may change according to the application. In an effort to enable one of ordinary skill in the art, any commercially available finite element analysis (FEA) may be used to properly determine the number of cavities 32 and their locations based upon the specific application.

In one embodiment, cavities 32 along the portion 24 are located substantially central therewith, while cavities 32 along portion 26 are located closer to attachment means 40. Consequently, the cavities 32 may not exactly oppose each other, meaning that they may be asymmetric about a vertical axis A extending vertically between attachment means 40 and top portion 28 and through the center of tubular member 22. The asymmetrical alignment of cavities 32 substantially equalizes the stress imbalances arising between portions 24, 26, the imbalance resulting in part from the alignment of bulb 20 on attachment means 40. However, it is contemplated that other cavity orientations may exist based upon the bulb seal 10 design and/or use thereof.

Bulb 20 connects to attachment means (or attachment member) 40 at connection 33. In one embodiment, for a side-bulb configuration (where bulb 20 is located on either vertical side of a "U" shaped attachment means 40), connection 33 is located closest to the opening of attachment means 40. By so locating connection 33, the neutral axis of bulb 20 shifts to reduce stress levels in side portions 24, 26 for navigation of both outside and inside corners. A connection cavity 33a may be located at or near connection 33. Also, a wrapping connector edge (or rotation-resisting extension) 34 may exist that extends around the end of attachment means 40 to supply additional rotational resistance, as bulb 20 attempts to rotate away from edge 34 within a corner (when edge 34 faces the inside of the navigated corner). For example, when portion 24 faces the inside of a navigated corner, portion 24 experiences compressive loads while portion 26 experiences tensile loads. In this example, bulb 20 would otherwise collapse upon itself (buckle) and rotate toward portion 26 because the resulting stress imbalance creates a rotating moment about connection 33. Together, the location and quantity of cavities 32, the location of connection 33, and the wrapping of connection edge 34 substantially equalize the stress imbalance, thereby substantially maintaining a consistent cross-sectional area of bulb 20 along a perimeter that navigates inside and/or outside corners.

Figure 2:
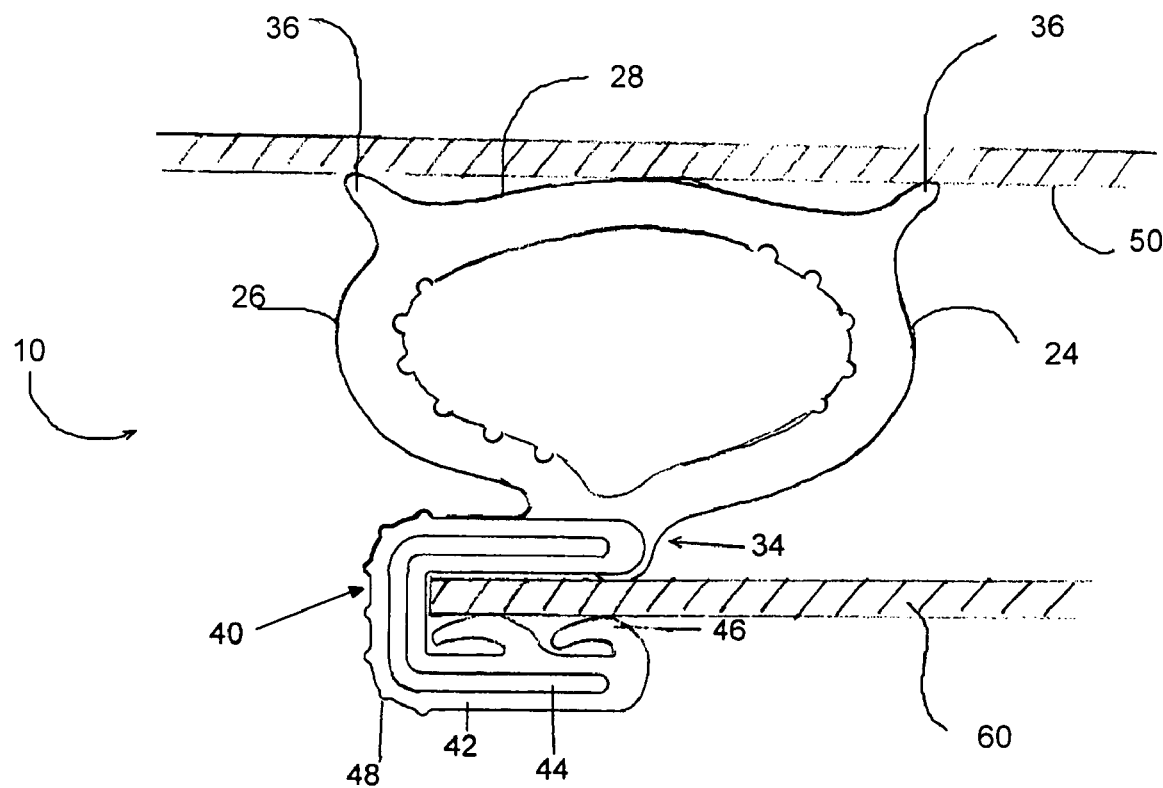
FIG. 2 is a cross-sectional view of the bulb seal of FIG. 1, in a deformed state.

On both side portions 24, 26 of bulb 20 away from attachment means 40 are two (2) (or a pair of) collapse-controlling protrusions 36. Protrusions 36 work in conjunction with cavities 32 to ensure a symmetrical and centered collapse of bulb 20, when the sealing surface 50 exerts a closing force upon bulb 20 by engaging top portion 28. Protrusions 36 act as centering constraints by directing the deflection of top portion 28 inwardly between protrusions 36, thereby allowing protrusions 36 to contact the sealing surface 50 when the deflection is great enough, as shown in FIG. 2. The protrusions 36 may not exactly oppose each other, meaning that they may be asymmetric about a vertical axis A extending vertically between attachment means 40 and top portion 28 and through the center of tubular member 22. In this scenario, protrusions 36 act in addition to top portion 28 to provide sealing capabilities. The focused deflection of top 28 is a result of the increase in bulb 20 wall thickness at protrusions 36, of which provides a natural deflection point on either side thereof for the collapse of top portion 28. It follows that because protrusions 36 are more rigid than the surrounding bulb 20 wall, protrusions 36 maintain their contact positions on the sealing surface 50. In the end, protrusions 36 constrain bulb 20 from further rotation and directs inward symmetrical bulb 20 deflection thereafter in a direction perpendicular to and away from the sealing surface 50 (in the direction of the closing load). Cavities 32 also ensure symmetrical bulb 20 collapse (they are collapse-controlling) by reducing the wall thickness of bulb 20 at predetermined areas, thereby providing natural deflection points.

In one embodiment, attachment means (or attachment member) 40 is "U" shaped and comprises a base 42, an internal stiffening member 44, and securing prongs 46. It is contemplated that other applications may require a different commercially known attachment means, including the use of adhesives or fasteners and different attachment means shapes (circular, "V" shaped, etc.). It is also contemplated that attachment means 40 may not include internal stiffening member 44 or securing prongs 46, instead relying on the displacement of base 42 by the received component to generate the requisite securement forces.

Stiffening member 44 is included within attachment means 40 to provide means 40 more rigidity, thereby allowing means to better function as a clip. In one embodiment, stiffening member 44 extends substantially within base 42. However, it is contemplated that certain areas may or may not need more rigidity. Therefore it is contemplated that different applications may require alternative stiffening member 44 designs, where member 44 may not extend substantially within base 42 or member 44 may comprise various thicknesses.

Attachment means 40 forms a component-receiving cavity, in which securing prongs 46 extend into from the interior of attachment means 40. Prongs 46 secure seal 10 to the received component 60 by forcing the component against the opposing interior surface of attachment means 40. It is contemplated that other means may be used other than prongs 46 to retain a component within means 40, such as a fastener, adhesives, or a thickened material interference portion. Connection edge 34 also provides sealing properties along the received component 60.

Although this disclosure has focused on side-bulb seal orientations, other orientations may use the bulb 20 design as disclosed herein, for example in top-bulb orientations where bulb 20 rests atop an inverted "U" shaped attachment means 40.

Although the present invention has been described in detail above, the same is by way of illustration and example only and is not to be taken as a limitation on the present invention.

I claim the following:

1. A seal comprising:
   a tubular member having a length and a cross section that comprises:
      a top portion, a bottom portion, and opposing side portions;
      an interior surface and an exterior surface, wherein a sealing first contact surface comprises at least a portion of the top portion of the exterior surface;
      a pair of collapse-controlling protrusions located on the exterior surface, wherein each of the protrusions are located between the contact surface and one of the side portions such that the contact surface is located between the pair of protrusions;
      a first plurality of shape-maintaining cavities located along one side portion of the interior surface and a second portion of shape-maintaining cavities located along the opposing side portion of the interior surface, wherein the first and second pluralities are asymmetrically opposite each other about a vertical axis extending between the bottom and top portions and through a center of the tubular member; and
      a rotation-resisting extension; and
   means for attaching the seal to a desired object, wherein the means is operably attached to the tubular member along the member's length at the bottom portion of the member,
   wherein the rotation-resisting extension extends from the tubular member and operably connects to the means for attaching.

2. The seal as recited in claim 1, wherein the tubular member also includes a base cavity located on the interior surface substantially adjacent the means for attaching and offset a distance from the vertical axis.

3. The seal as recited in claim 1, wherein the means for attachment comprises a U-shaped attachment member having an open end, a closed end, and a pair of legs extending between the closed end and the open end.

4. The seal as recited in claim 3, wherein the tubular member operably attaches to the U-shaped member along a leg nearest the open end, such that the tubular member is located away from a midpoint of the leg.

5. The seal as recited in claim 4, wherein the tubular member also includes a rotation-resisting extension, the extension extending from the tubular member, around the leg to which the body is attached, and into the open end of the attachment member.

6. The seal as recited in claim 3, wherein the attachment member contains at least one retention member protruding from a leg.

7. The seal as recited in claim 3, wherein the connection member contains a continuous stiffening member that extends from one leg to the other leg through the closed end.

8. The seal as recited in claim 2, wherein the tubular member is monolithic with the means for attaching.

9. The seal as recited in claim 1, wherein the tubular member includes a first plurality of vent holes located along a portion of the interior surface.

10. The seal as recited in claim 1, wherein the shape-maintaining cavities are also collapse-controlling cavities.

11. The seal as recited in claim 1, wherein the seal is monolithically formed.

12. The seal as recited in claim 1, wherein the pair of protrusions are asymmetrically located about a vertical axis extending between the bottom portion and the top portion of the tubular member and a center of the tubular member.

13. A seal comprising:
    a tubular member having a length and a cross section that comprises:
       a top portion, a bottom portion, and opposing side portions;
       an interior surface and an exterior surface, wherein a sealing first contact surface comprises at least a portion of the top portion of the exterior surface;
       a pair of collapse-controlling protrusions located on the exterior surface, each of the protrusions being located between the contact surface and one of the side portions such that the contact surface is located between the pair of protrusions, wherein the pair of protrusions are asymmetrically opposite each other about a vertical axis extending between the bottom and top portions and through a center of the tubular member;
       a first plurality of strain-controlling cavities located along one side portion of the interior surface and a second portion of strain controlling cavities located along the opposing side portion of the interior surface; and
       a rotation-resisting extension; and
    an attachment member operably attached to the tubular member along the member's length,
    wherein the rotation-resisting extension extends from the tubular member and operably connects to the attachment member.

14. The seal as recited in claim 13 wherein the first and second pluralities are asymmetrically opposite each other about a vertical axis extending between the bottom and top portions of the tubular member and through a center of the tubular member.

15. The seal as recited in claim wherein the tubular member also includes a base cavity located on the interior surface substantially adjacent the means for attaching and offset a distance from the vertical axis.

16. A bulb seal capable of navigating both interior and exterior corners of an opening comprising:
    a top portion, a bottom portion, and opposing side portions;
    an interior surface and an exterior surface, wherein a sealing first contact surface comprises at least a portion of the top portion of the exterior surface;
    a pair of collapse-controlling protrusions located on the exterior surface, each of the protrusions being located between the contact surface and one of the side portions such that the contact surface is located between the pair of protrusions;
    a first plurality of rotation resisting cavities located along one side portion of the interior surface and a second portion of rotation resisting cavities located along the opposing side portion of the interior surface, wherein the first and second pluralities of cavities are asymmetrically opposite each other about a vertical axis extending between the bottom and top portions and through a center of the tubular member; and a rotation-resisting extension; and a U-shaped attachment member monolithic with the tubular member along the member's length and having an open end, a closed end, and a pair of legs extending between the closed end and the open end, the member located approximately opposite the sealing contact surface;

wherein the rotation-resisting extension extends between the tubular member and the attachment member, the extension being monolithic with each member.

17. The seal as recited in claim 16, wherein the tubular member also includes a base cavity located on the interior surface substantially adjacent the means for attaching and offset a distance from the vertical axis.

18. The seal as recited in claim 16, wherein the pair of protrusions are asymmetrically located about a vertical axis extending between the bottom portion and the top portion of the tubular member and a center of the tubular member.

* * * * *